United States Patent
Bogard

[11] Patent Number: 6,082,806
[45] Date of Patent: Jul. 4, 2000

[54] PICK-UP TRUCK TONNEAU COVER

[76] Inventor: Donald E. Bogard, 22204 Dolphin Ct., Dearborn Heights, Mich. 48127

[21] Appl. No.: 09/174,269

[22] Filed: Oct. 16, 1998

[51] Int. Cl.[7] ..................................................... B60P 7/02
[52] U.S. Cl. .............................. 296/100.06; 296/100.09; 296/100.07
[58] Field of Search ..................... 296/100.06, 100.02, 296/100.04, 100.07, 100.09

[56] References Cited

U.S. PATENT DOCUMENTS

| | | | |
|---|---|---|---|
| 3,489,456 | 1/1970 | Klanke | 296/100.07 |
| 4,313,636 | 2/1982 | Deeds | 296/100.09 |
| 4,418,954 | 12/1983 | Buckley | 296/100.09 |
| 4,615,557 | 10/1986 | Robinson | 296/100.07 |
| 4,747,441 | 5/1988 | Apolzer et al. | 296/100.09 |
| 4,824,162 | 4/1989 | Geisler et al. | 296/100.09 |
| 4,844,531 | 7/1989 | Kooiker | 296/100.09 |
| 4,861,092 | 8/1989 | Bogard | 296/100.09 |
| 4,932,717 | 6/1990 | Swann | 296/100.09 |
| 5,087,093 | 2/1992 | Repetti | 296/100.09 |
| 5,427,428 | 6/1995 | Ericson et al. | 296/100.09 |
| 5,595,417 | 1/1997 | Thoman | 296/100.09 |
| 5,653,491 | 8/1997 | Steffens et al. | 296/100.09 |
| 5,857,729 | 1/1999 | Bogard | 296/100.09 |
| 5,882,058 | 3/1999 | Karrer | 296/100.01 |
| 5,931,521 | 8/1999 | Kooiker | 296/100.09 |
| 5,961,173 | 10/1999 | Repetti | 296/100.09 |

*Primary Examiner*—Joseph D. Pape
*Assistant Examiner*—Kiran Patel
*Attorney, Agent, or Firm*—Alex Rhodes

[57] ABSTRACT

A construction and method for reducing inventory and investment costs. The construction and method allow tonneau covers to be manufactured for a variety of pick-up trucks with standard machines from a common inventory of raw materials. The construction is comprised of thin rectangular panels mounted in tubular frames. The panels and frames are manufactured by cutting and drilling raw materials selected from a common stock of sheets and extruded aluminum tubes. The construction permits completed covers to be sold or as kits with instructions for assembly with common hand tools by ultimate purchasers. The construction and method further provide improvements for installing and removing tonneau covers from pick-up trucks.

14 Claims, 6 Drawing Sheets

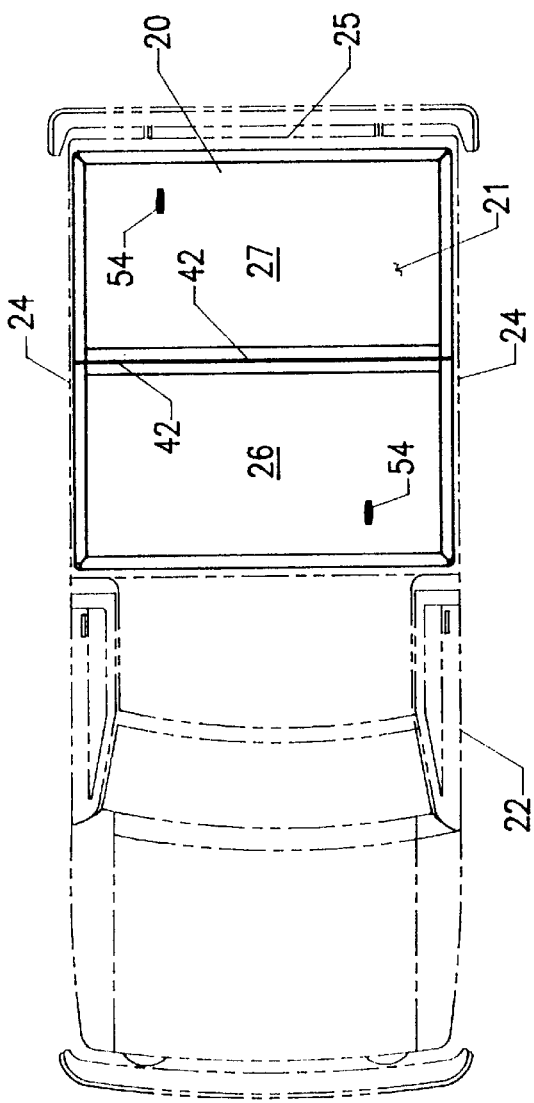
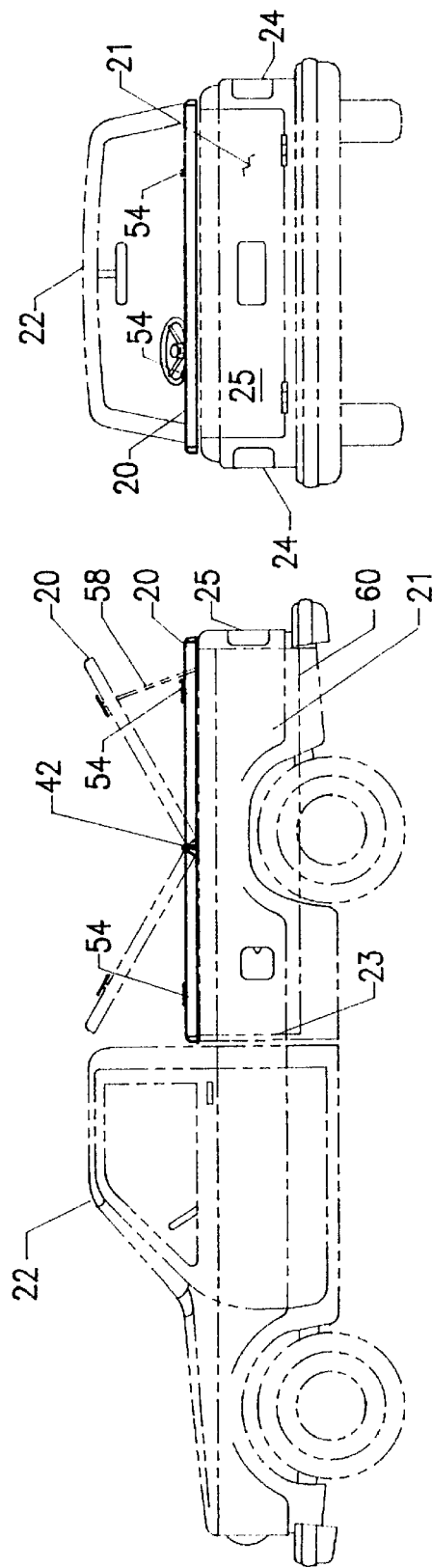
FIG. 1
FIG. 2
FIG. 3

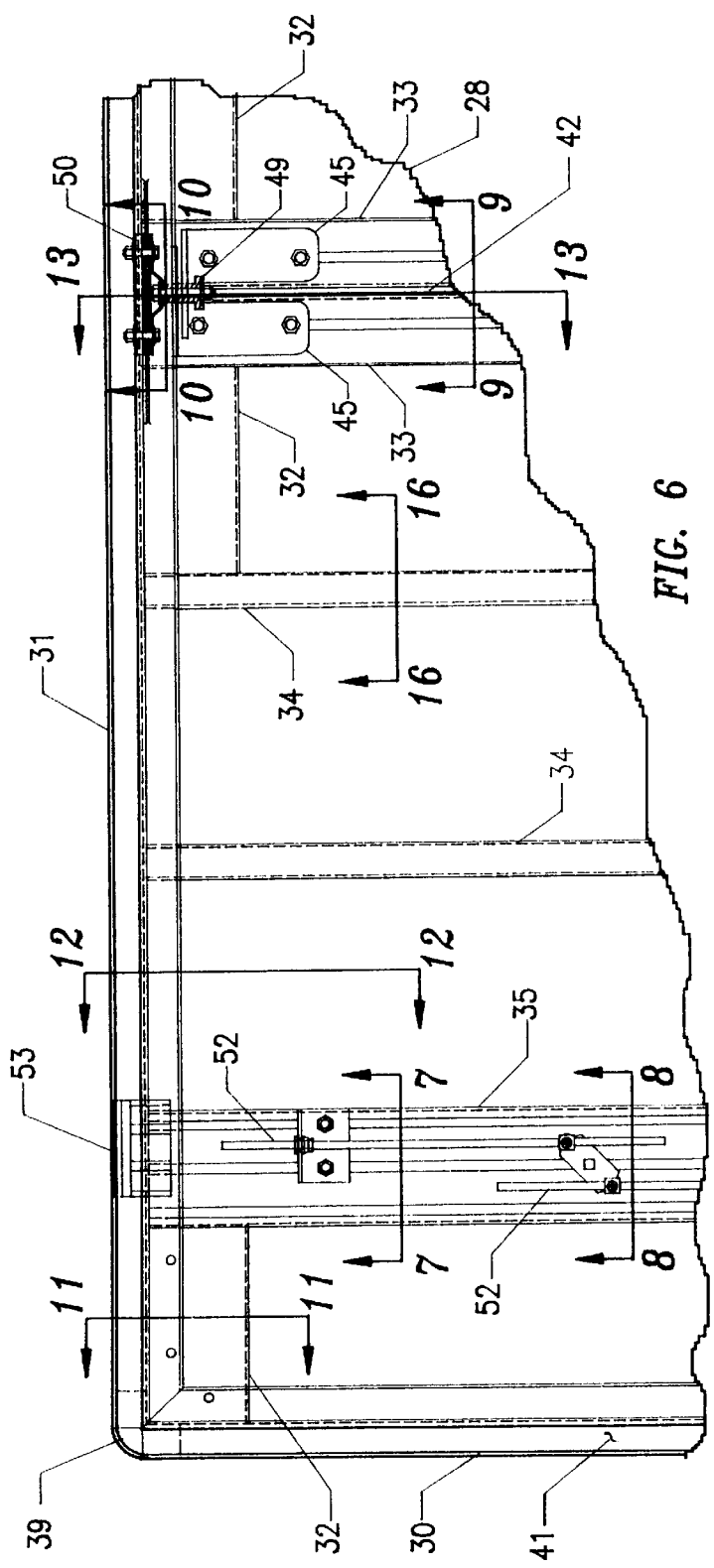
FIG. 6
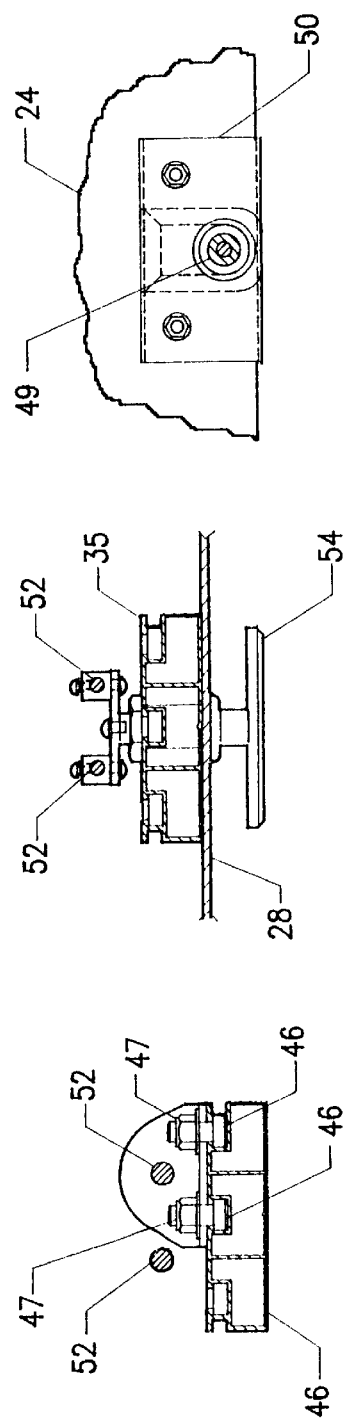
FIG. 10
FIG. 8
FIG. 7

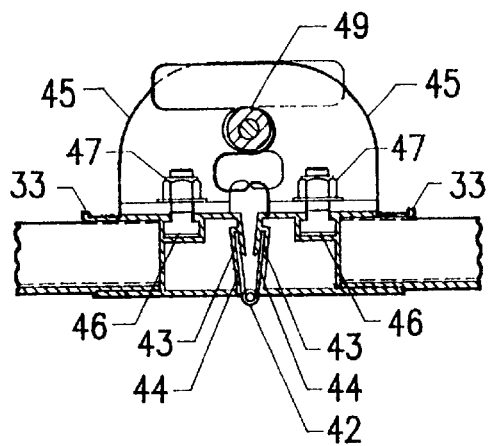
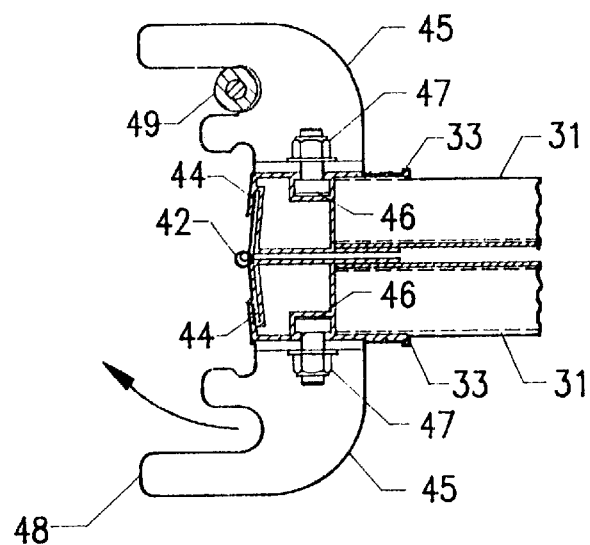
FIG. 9
FIG. 9A
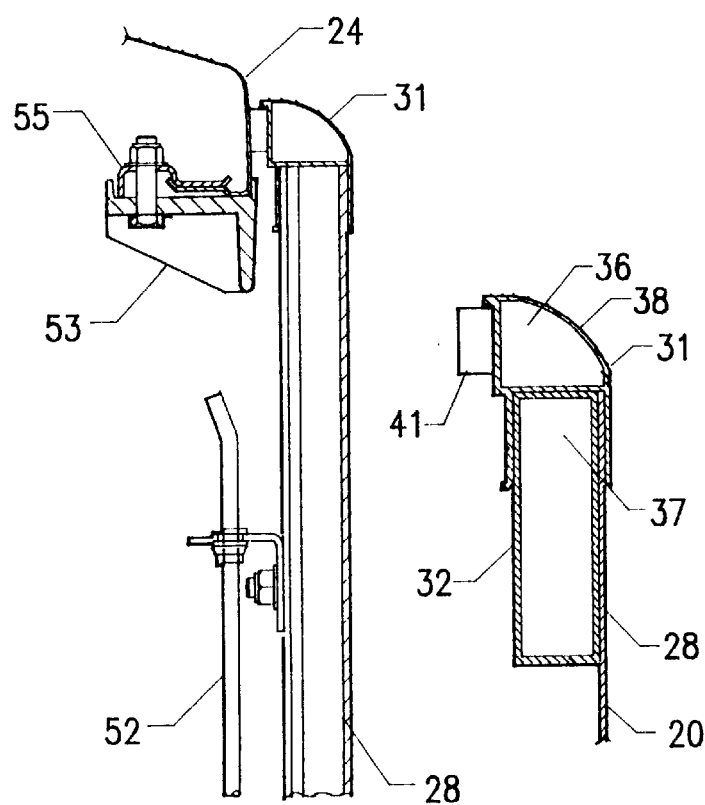
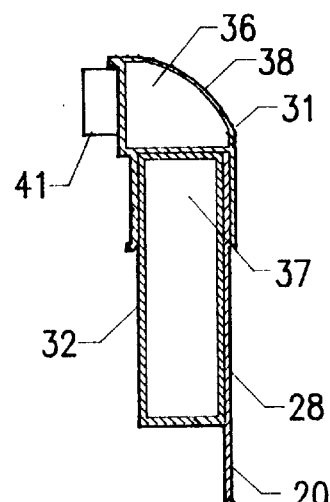
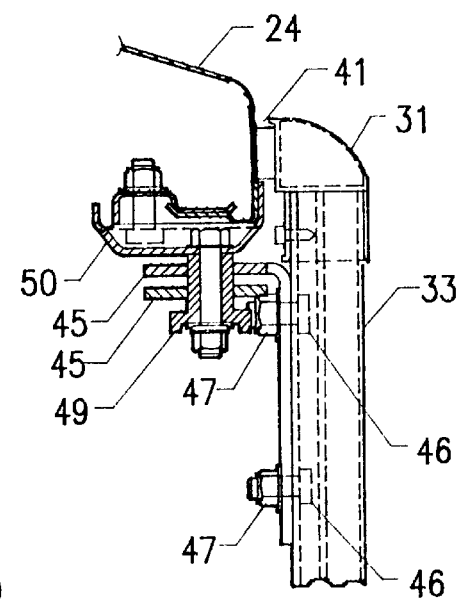
FIG. 12  FIG. 11  FIG. 13

PICK-UP TRUCK TONNEAU COVER

FIELD OF THE INVENTION

This invention relates to pick-up truck covers and more particularly to a construction and method for reducing the inventories and tooling costs of tonneau covers.

BACKGROUND OF THE INVENTION

The diversity in pick-up trucks substantially affects the costs of current tonneau covers, particularly those trucks which are manufactured in small quantities. Moreover, companies are unwilling to manufacture and/or stock tonneau covers for older trucks and/or trucks which exist in limited quantities. Tonneau cover manufacturing and inventories are limited to covers wherein manufacturers can profit and recover investments in reasonable times. Investments in tooling significantly affect current tonneau cover prices.

Current methods of installing tonneau covers on pick-up trucks are difficult and affect quality and function of tonneau covers.

SUMMARY OF THE INVENTION

The foregoing drawbacks and difficulties with pick-up truck covers are completely overcome with the present invention. The drawbacks and difficulties are overcome by providing an improved construction and method for making and installing pick-up truck covers for a variety of pick-up trucks. The invention resides in features which individually and collectively contribute to its ability to substantially reduce inventory and the investment for tools and equipment. The construction is comprised of thin rectangular panels mounted in tubular frames. The panels and frames are manufactured by cutting and drilling raw materials selected from a common stock of sheets and extruded aluminum tubes.

Another benefit of the invention is that covers can be sold as kits for assembly with common hand tools by ultimate purchasers. Another benefit of the invention is that covers can be provided from "just in time inventories" of raw materials and manufactured as needed.

Another benefit of the invention is that covers can be supplied for older and limited production trucks with minor, if any, investments in tools and special machines. Still yet another benefit is that flexible machining methods can be utilized for the drilling and cutting of the sheets and extrusions. Still yet another advantage is that the cover can be easily and quickly installed with common and reaily available hand tools.

Further features and benefits will become apparent by reference to the drawings and ensuing detailed description of a preferred embodiment which discloses the best mode contemplated in carrying out the invention. The exclusive rights which are claimed are set forth in each of the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating specific embodiments of the invention by way of non-limiting example only.

FIG. 1 is a front view of a plan view of the present invention mounted on a pick-up truck cargo bed.

FIG. 2 is a left side view of the tonneau cover and the pick-up truck.

FIG. 3 is a rear view of the tonneau cover and the pick-up truck.

FIG. 6 is an enlarged fragmentary view of FIG. 5.

FIG. 7 is an enlarged cross-sectional view taken on the line 7—7 in FIG. 6.

FIG. 8 is an enlarged cross-sectional view taken on the line 8—8 in FIG. 6.

FIG. 9 is an enlarged cross-sectional view taken on the line 9—9 in FIG. 6 showing a pair of tonneau cover panels in closed positions.

FIG. 9A is an enlarged cross-sectional view taken in a similar manner as FIG. 9 showing one of the tonneau cover panels in a fully open position.

FIG. 10 is an enlarged cross-sectional view taken on the line 10—10 in FIG. 6.

FIG. 11 is an enlarged cross-sectional view taken on the line 11—11 in FIG. 6.

FIG. 12 is an enlarged cross-sectional view taken on the line 12—12 in FIG. 6.

FIG. 13 is an enlarged cross-sectional view taken on the line 13—13 in FIG. 6.

DETAILED DESCRIPTION OF THE PREFERRED EMBODIMENT

Figure 4:
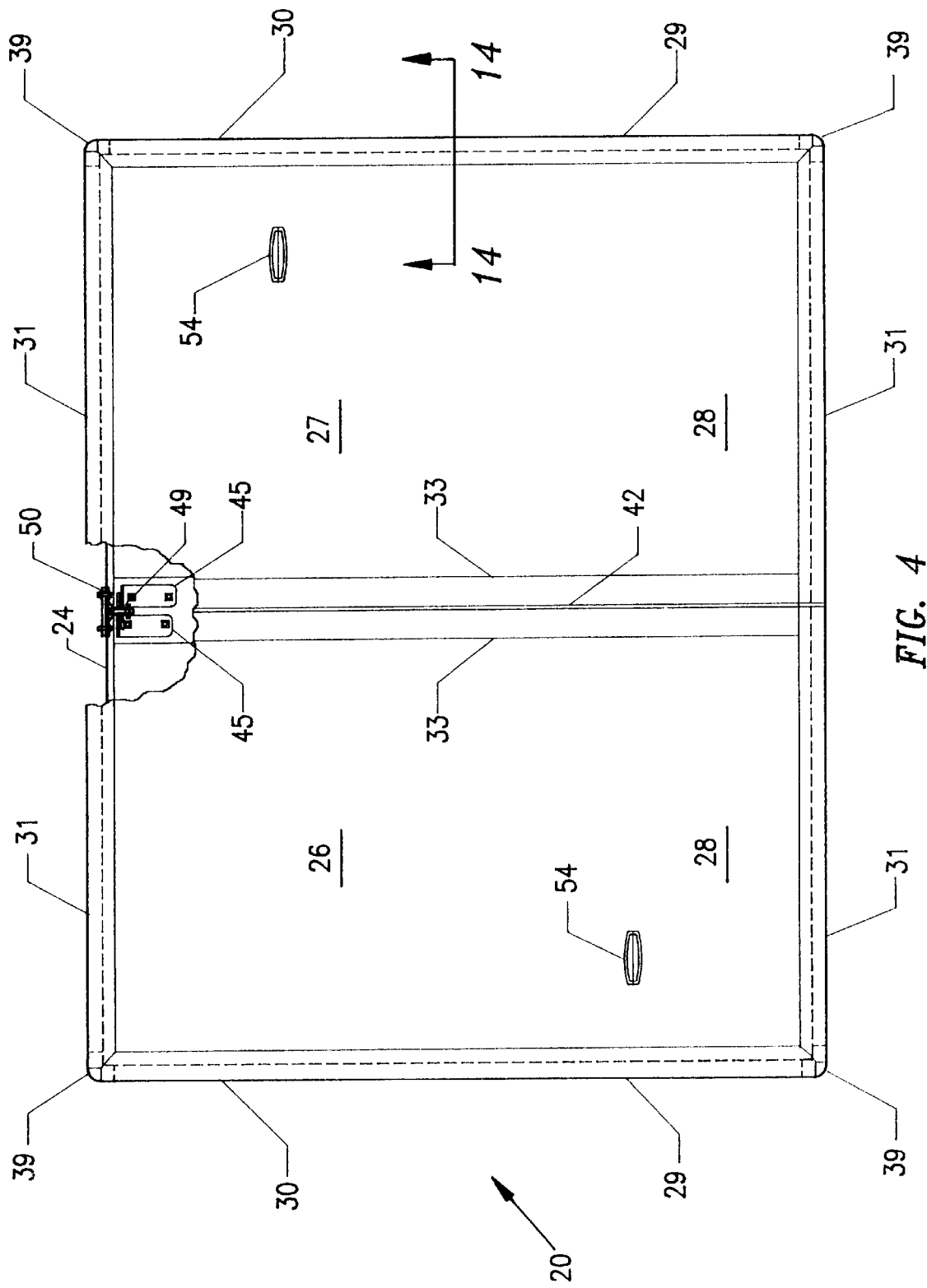
FIG. 4 is a plan view drawn to an enlarged scale of the tonneau cover.

Referring now to the drawings wherein like numerals designate like and corresponding parts throughout the several views, a tonneau cover 20, according to the present invention, is shown mounted on an open cargo box 21 of a conventional pick-up truck 22. The cargo box 21 is bounded by a horizontal floor 60, a vertical front wall 23, vertical side walls 24, and a rear tailgate 25. The tailgate 25 is movable from a vertical position for enclosing the cargo box 21 to a horizontal position for opening the cargo box 21.

A primary object of the present invention is to reduce the amount of tools, equipment and inventory for providing tonneau covers for a variety of cargo box sizes. Another object is to improve the method of installing the tonneau covers on pick-up trucks. Since numerous alterations or modifications can be made in the preferred embodiment, without departing from the scope of this invention, the following detailed disclosure is intended as an example for achieving the present invention and is not intended, in any way, to limit the scope of the invention.

The tonneau cover 20 is comprised of a front section 26 and a similar pivotally connected rear section 27. The front 26 and rear 27 sections are comprised of thin rectangular panels 28 mounted in frames 29. The frames 29 are formed from adjoining slender tubular outer members 30, side members 31, reinforcing members 32 and lateral crossmembers 33, 34 and 35. In the preferred embodiment 20, the tubular frame members are aluminum extrusions. Aluminum extrusions provide several advantages. One advantage is reduced weight. Another advantage is that post extrusion operations are limited to cutting and drilling with conventional machines. It will be understood that some or all of the tubular members can also be fabricated by stamping or roll forming sheet materials or by other usual means.

Figure 14:
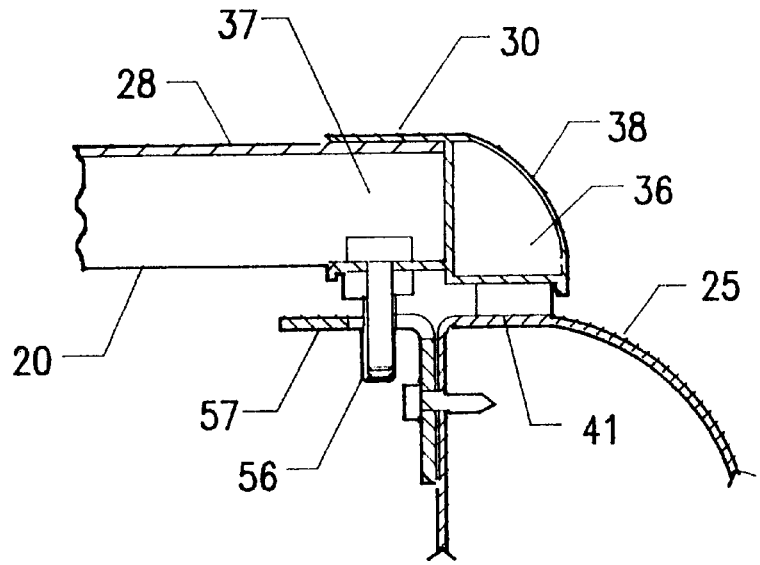
FIG. 14 is an enlarged cross-sectional view taken on the line 14—14 in FIG. 4.
Figure 16:
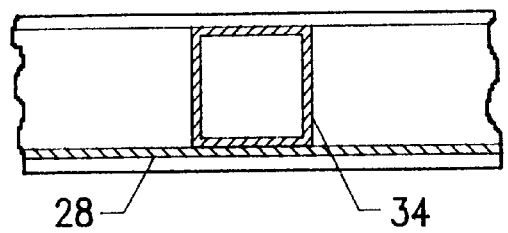
FIG. 16 is an enlarged cross-sectional view taken on the line 16—16 in FIG. 6.

The cross-sections of the tubular frame members are shown in FIGS. 7, 9, 11 and 16. For the illustrated embodiment 20, five types of extrusions are used. One extrusion, shown in FIG. 14, is used for the outer members 30 and side 31 frame members. One extrusion, shown in FIG. 11, is used for the short reinforcing members 32. One extrusion, shown in FIG. 9, is used for innermost crossmembers 33. One extrusion, shown in FIG. 16, is used for intermediate crossmembers 34; and one extrusion is used for outermost crossmembers 35. With reference to FIG. 11, the tubular outer 30 and side 31 frame members are comprised of closed outer portions 36 and channel inner portions 37. The outer surfaces 38 are curved to present a pleasing appearance. The curved shape is arbitrary. Other shapes can be extruded to vary the appearance. The channel inner portions 37 of the side members 31 overlap the close fitting portions of the rectangular panels 28, the reinforcing members 32 and crossmembers 33, 34, 35. Molded plastic elbows 39 engage the closed portions 36 of the outer members 30 to form the corners of the cover 20. The tubular frame members 30, 31, 32, 33, 34, 35 and rectangular panels 28 are bonded together with adhesives or by other usual means. Additional retention of the reinforcing members 32 is provided with self-tapping screws 40. A seal 41 is bonded with an adhesive to the lower surfaces of the outer members 30. The seal 41 contacts the cargo box 21 when the cover 20 is closed.

Figure 5:
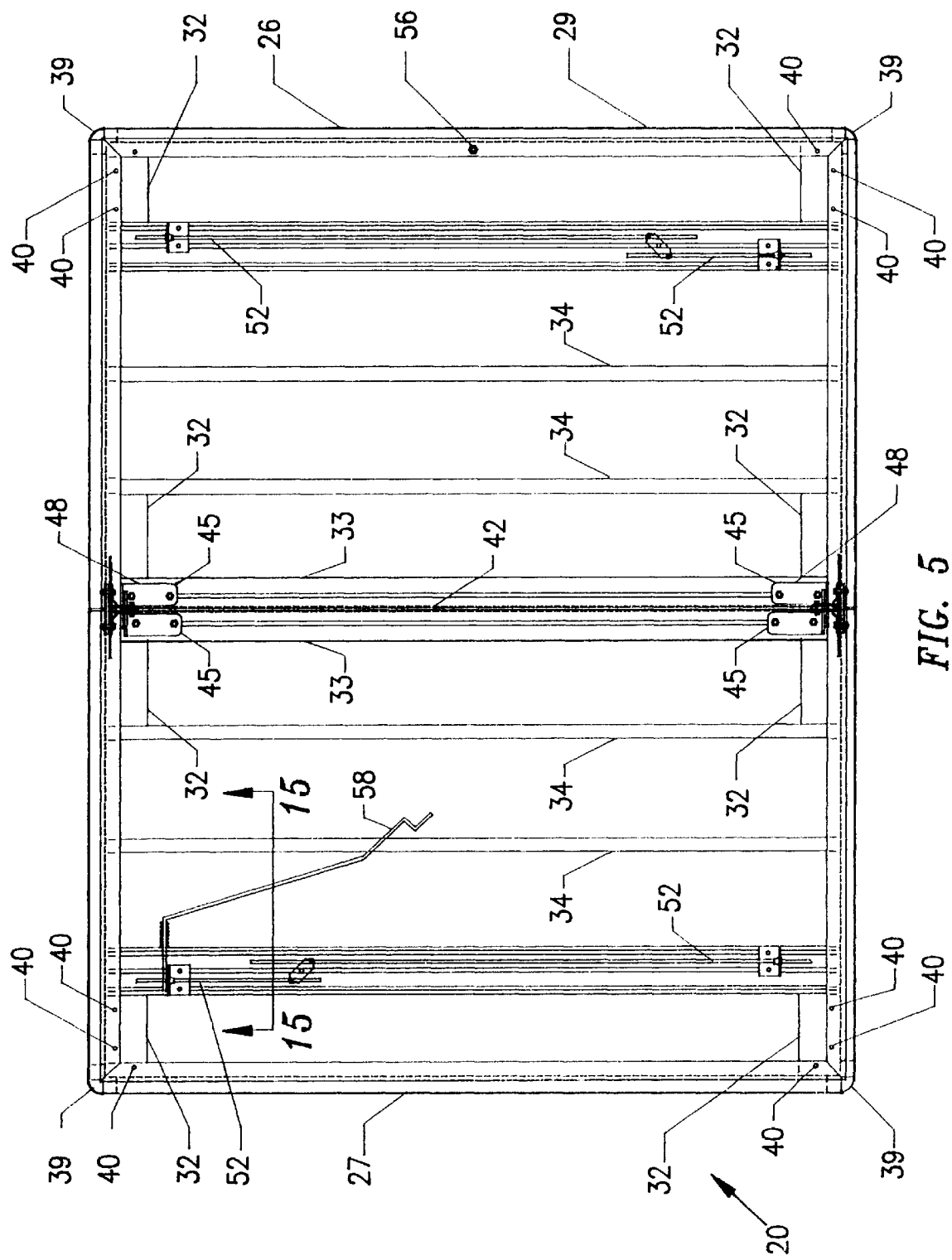
FIG. 5 is a bottom view drawn to an enlarged scale of the tonneau cover.

With reference to FIGS. 9 and 9A, the front 23 and rear 24 sections are pivotally connected with a hinge 42. Channel portions 43 of the innermost crossmembers 31 engage complementary hinge members 44. The complementary members 44 are retained in the channels 43 with an adhesive or other usual means. Referring to FIGS. 5 and 9, other channels extend laterally across bottom portions of the innermost crossmembers 33 and receive "T" bolts 46. The "T" bolts 46 engage nuts 47 which clamp complementary members 45 of other hinges 48 which pivotally attach the cover 20 to the truck 22. The "T" bolts 46 allow the hinges 48 to be laterally adjusted on the front 26 and rear 27 sections when the cover 20 is installed.

The method of pivoting the cover 20 on the cargo box 21 can be best understood by reference to FIGS. 6, 9, 9A and 13. Pivot shafts 49 extend inwardly from upper portions of the cargo box side walls 24. Referring to FIG. 13, the pivot shafts 49 are mounted on clamps 50 which attach the pivot shafts 49 to the cargo box side walls 24. The clamps 50 allow pivot shafts 49 to be longitudinally adjusted on the cargo box 21 when the cover 20 is installed.

Referring to FIGS. 9 and 9A, when the front 26 and/or rear 27 sections are opened, the complementary hinge members 45 separate, allowing the cover 20 to be installed or removed from the pick-up truck 22. The cover 20 is mounted and removed by opening the front 26 and/or rear 27 sections as shown in FIG. 9A to disengage the hinge members 45 from the pivot shafts 49. Thus, the procedure for installing and removing the cover 20 is simple, convenient and quick.

With reference to FIGS. 6, 7, 8 and 12, the cover 20 is selectively locked to the cargo box 21 with rods 52 that laterally engage strikers 53 mounted on the opposite side walls 24 of the cargo box 21. The transverse rods 52 are operated with "T" handles 54 which are rotatably mounted in the outermost crossmembers 35. Opposite rotations of the "T" handles 54 engage and disengage end portions of the rods 52 with the strikers 53. The strikers 53 are clamped to the cargo box 21 with clamps 55 which allow the strikers 53 to be longitudinally adjusted on the cargo box 21 when the cover 20 is installed.

Figure 15:
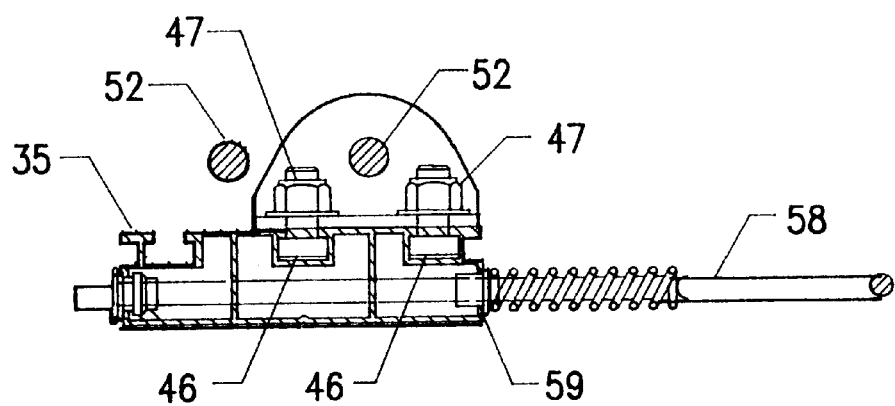
FIG. 15 is an enlarged cross-sectional view taken on the line 15—15 in FIG. 5.

Referring to FIG. 14, when the rear section 27 is closed, the tailgate 25 is automatically locked to the cargo box 21. A vertical pin 56 is mounted in the outermost crossmember 35. The pin engages a striker 57 which is mounted on the tailgate 25. When the rear section 27 is open, the cover is retained in the open position with a prop rod 58. As shown in FIG. 15, the prop rod 58 is mounted for rotation in a horizontal aperture 59 which extends through the outermost crossmember 35 of the cover 20.

Although only a single embodiment has been illustrated and described it will be appreciated that other embodiments can be developed by substitutions of parts and/or changes in material, shape and arrangement of parts without departing from the spirit thereof. By way of example, only a single section can be pivotally mounted on the cargo box within the spirit thereof.

What is claimed is:

1. In combination with a pick-up truck having an open cargo box bounded by a generally horizontal floor structure, a transverse front wall structure, opposing longitudinal side wall structures and a transverse tailgate, a tonneau cover rotatably mounted on said opposing side wall structures for enclosing said cargo box, said tonneau cover comprising at least one thin panel mounted in a generally rectangular outer frame; the outer frame having slender adjoining front, rear and side members, each of said frame members having a closed outer portion and a channel inner portion for receiving outer portions of said thin rectangular panel and a plurality of lateral crossmembers; corner members for engaging said end portions of said frame side members and end portions of said front and rear members; the plurality of lateral crossmembers, each having end portions slidably engaging said channel portions of said frame members; a pair of spaced apart complementary hinge members attached to opposite end portions of one of said lateral crossmembers, said hinges including inward extending pivot shafts attached to said cargo box side wall structures; a means for selectively adjusting the positions of said pivot shafts on said opposing cargo box side wall structures to longitudinally align said cover with said cargo box; and a means for selectively adjusting the positions of said hinge members on said crossmember to laterally align said cover with said cargo box; and a means for locking said cover to said cargo box.

2. The combination set forth in claim 1 further comprising a means for locking said cover to said cargo box, said means comprised of a pair of slender rods slidably mounted on said tubular frame for transverse movements in opposite directions on said cover; a handle rotatably mounted in said cover, a means attached to said handle for moving said rods in said opposite directions; and a striker attached to each of said opposing pick-up truck side structures for engaging end portions of said transverse rods.

3. The combination set forth in claim 1 further comprising a means for locking said tailgate to said cargo box, said means comprising a pin mounted on a rear portion of said cover; and a striker mounted on said tailgate for engaging said pin when said cover is in closed relationship with said cargo box.

4. The combination set forth in claim 1 further comprising a prop rod pivotally attached to a lower portion of said cover for supporting said cover in an open position.

5. In a combination of pick-up truck having an open cargo box bounded by a horizontal floor, a transverse front wall structure, opposing side wall structures and a tailgate, and a tonneau cover of the type having a front section and a rear section pivotally joined together for covering and uncovering said open cargo box, the improvement comprising: each of said sections having a thin rectangular panel mounted in an outer frame, each of said frames comprising slender adjoining front, rear and side members, each of said frame members having a closed outer portion and a channel inner portion for receiving said thin rectangular panels and a plurality of lateral crossmembers; the plurality of lateral crossmembers, each having end portions engaging said channel portions of said frame side member; a pair of spaced apart complementary hinge members attached to opposite end portions of one of said crossmembers, said hinges including inward extending pivot shafts attached to said cargo box side wall structures; a means for selectively adjusting the position of each of said pivot shafts on said opposing cargo box side wall structures; and a means for slideably adjusting the location of each of said complementary hinge members on said lateral crossmember.

6. The improvement set forth in claim 5 further comprising a means for locking said tailgate to said cargo box when said cover is in covering relationship to said cargo box.

7. A method for reducing inventory and investment costs for manufacturing a series of tonneau covers for enclosing open cargo boxes of a variety of pick-up trucks comprising the steps of: selecting a thin sheet, long slender tubes, and components for mounting and locking said cover to said cargo bed from an inventory of a standard size sheet, long slender tubes, cover mounting components and cover locking components; sizing said sheet, by cutting, to provide a rectangular panel for enclosing an open cargo box; cutting said long slender tubes to provide front, rear, side members and crossmembers for an outer frame of said tonneau cover; drilling apertures in said tubular members for assembling said tonneau cover; joining said tubular members and said crossmember to form said frame of said tonneau cover; joining said rectangular panel to said frame; attaching a standard hinge from said mounting components on opposite end portions of one of said crossmembers to pivotally mount said cover to side wall structures of said cargo box; and attaching standard locking components on said frame to lock said cover to said cargo box.

8. The method set forth in claim 7 comprising the step of forming said long slender tubes by extrusion.

9. The method set forth in claim 8 further comprising the step of joining said tubular frame members to said thin cut sheet with adhesives.

10. The method set forth in claim 8 further comprising the step of clamping a pair of transverse rods to said cover for locking said cover to said pick-up truck cargo box.

11. The method set forth in claim 8 further comprising the step of forming corners of said cover by inserting elbows in closed end portions of said tubular members.

12. The method set forth in claim 7 further comprising the steps of selectively adjusting the position of each of said hinges on said opposing cargo box side wall structures to longitudinally align said cover with said cargo box and the step of laterally adjusting the position of each of said hinges on said cover to laterally align said cover with said cargo box.

13. The method set forth in claim 7 further comprising the steps of joining together a second set of said tubular members and said crossmember to form a second frame of said tonneau cover; joining a second cut thin sheet to said second frame; and pivotally connecting said second frame to said other frame to form two sections of said tonneau cover to enclose said open cargo box.

14. In combination with a pick-up truck having an open cargo box bounded by a generally horizontal floor structure, a transverse front wall structure, opposing longitudinal side wall structures and a transverse tailgate, a tonneau cover rotatably mounted on said side structures for enclosing said cargo box, said tonneau cover comprised of at least one thin rectangular panel mounted in a frame; the frame, said frame comprising slender adjoining front, rear and side members and a plurality of lateral crossmembers, said frame members having closed end portions for receiving end portions of small elbows to form outer corners of said cover; a small elbow at each of said end portions of said frame members; a pair of hinges mounted on one of said crossmembers and said cargo box side wall structures for pivotally mounting said cover to said cargo box, said hinges including inward extending pivot shaft attached to said cargo box side structures, said pivot shafts being selectively movable along said cargo box side structures to longitudinally align said cover with said cargo box; hinge members clamped to said tubular frame for lateral adjustment on said tubular frame, said hinges further being selectively adjustable on said crossmember to laterally align said cover on said cargo box; and a means for locking said tailgate to said cargo box, said means comprising a pin mounted on a rear portion of said cover; and a striker mounted on said tailgate for engaging said pin when said cover is in closed relationship with said cargo box.

* * * * *